United States Patent
Hampo et al.

(10) Patent No.: US 9,211,798 B2
(45) Date of Patent: Dec. 15, 2015

(54) MULTISTAGE POWER SUPPLY SYSTEM AND METHOD FOR PROVIDING UNINTERRUPTED POWER TO VEHICLE CIRCUITRY

(75) Inventors: Richard J. Hampo, Plymouth, MI (US); Krzysztof Klesyk, Novi, MI (US); Jingsheng Liao, Farmington Hills, MI (US)

(73) Assignee: Lear Corporation, Southfield, MI (US)

( * ) Notice: Subject to any disclaimer, the term of this patent is extended or adjusted under 35 U.S.C. 154(b) by 746 days.

(21) Appl. No.: 13/192,559

(22) Filed: Jul. 28, 2011

(65) Prior Publication Data

US 2013/0026827 A1 Jan. 31, 2013

(51) Int. Cl.
*B60L 1/00* (2006.01)
*B60L 11/18* (2006.01)

(52) U.S. Cl.
CPC ......... *B60L 11/1816* (2013.01); *B60L 11/1868* (2013.01); *B60L 2210/14* (2013.01); *B60L 2210/30* (2013.01); *Y02T 10/7005* (2013.01); *Y02T 10/7066* (2013.01); *Y02T 10/7225* (2013.01); *Y02T 10/7241* (2013.01); *Y02T 90/127* (2013.01); *Y02T 90/14* (2013.01); *Y02T 90/16* (2013.01)

(58) Field of Classification Search
CPC ............ B60L 11/1816; B60L 11/1868; Y02T 10/7088; Y02T 10/7005; Y02T 90/121
USPC ........................................................ 307/10.1
See application file for complete search history.

(56) References Cited

U.S. PATENT DOCUMENTS

| 4,439,819 A | 3/1984 | Regan |
| 4,897,662 A | 1/1990 | Lee et al. |
| 5,012,113 A | 4/1991 | Valentine et al. |

(Continued)

FOREIGN PATENT DOCUMENTS

| CN | 1351775 A | 5/2002 |
| CN | 1870374 A | 11/2006 |

(Continued)

OTHER PUBLICATIONS

Chinese Patent Application No. 201210234449.5, Office Action dated May 29, 2014.

(Continued)

*Primary Examiner* — Rexford Barnie
*Assistant Examiner* — Toan Vu
(74) *Attorney, Agent, or Firm* — Brooks Kushman P.C.

(57) ABSTRACT

A multistage power supply system and method for providing uninterrupted low voltage electrical power to control circuitry in an electric or hybrid-electric vehicle. A first stage includes a converter for receiving a low voltage input from a vehicle battery and converting the vehicle battery low voltage input to a high voltage output. A second stage provided in series communication with the first stage includes a converter for receiving one of a rectified AC high voltage input and the first stage high voltage output and converting the one of the rectified AC high voltage input and the first stage high voltage output to a low voltage output for use in powering the vehicle control circuitry. The low voltage output is produced by the second stage from the rectified AC high voltage input when the rectified AC high voltage input is present, and the low voltage output is produced by the second stage from the first stage high voltage output when the rectified AC high voltage input is absent.

16 Claims, 2 Drawing Sheets

(56) References Cited

U.S. PATENT DOCUMENTS

| | | | |
|---|---|---|---|
| 5,151,645 A | 9/1992 | Murata | |
| 5,617,466 A | 4/1997 | Walance | |
| 5,978,236 A * | 11/1999 | Faberman et al. | 307/66 |
| 6,393,571 B1 | 5/2002 | Huckfeldt et al. | |
| 6,459,247 B1 | 10/2002 | Benes | |
| 6,662,123 B2 | 12/2003 | Maeckel et al. | |
| 6,724,593 B1 | 4/2004 | Smith | |
| 6,905,362 B2 | 6/2005 | Williams | |
| 6,963,186 B2 | 11/2005 | Hobbs | |
| 7,253,584 B2 | 8/2007 | Souther et al. | |
| 7,279,805 B2 | 10/2007 | Senda et al. | |
| 7,411,371 B2 | 8/2008 | Hobbs | |
| 7,506,182 B2 | 3/2009 | Taniguchi et al. | |
| 7,579,807 B2 | 8/2009 | Funabashi et al. | |
| 7,791,217 B2 | 9/2010 | Kamaga | |
| 7,878,866 B1 | 2/2011 | Kwasny et al. | |
| 8,109,139 B2 | 2/2012 | Wagner et al. | |
| 8,244,422 B2 | 8/2012 | Fujitake | |
| 8,450,980 B2 * | 5/2013 | Kumar et al. | 320/138 |
| 8,749,198 B2 | 6/2014 | Klesyk | |
| 8,791,666 B2 | 7/2014 | Yokoyama et al. | |
| 8,945,735 B2 | 2/2015 | Kim | |
| 2002/0041174 A1 | 4/2002 | Purkey | |
| 2002/0081486 A1 | 6/2002 | Williams | |
| 2004/0125626 A1 | 7/2004 | Kanouda et al. | |
| 2004/0130288 A1 | 7/2004 | Souther et al. | |
| 2004/0169489 A1 | 9/2004 | Hobbs | |
| 2005/0141163 A1 | 6/2005 | Franke et al. | |
| 2005/0212438 A1 | 9/2005 | Senda et al. | |
| 2006/0028178 A1 | 2/2006 | Hobbs | |
| 2006/0267410 A1 * | 11/2006 | Kanouda et al. | 307/66 |
| 2007/0132457 A1 | 6/2007 | Okamoto et al. | |
| 2008/0136371 A1 | 6/2008 | Sutardja | |
| 2008/0205086 A1 | 8/2008 | Darroman et al. | |
| 2009/0026837 A1 | 1/2009 | Lee | |
| 2009/0033253 A1 | 2/2009 | Nagashima et al. | |
| 2009/0034308 A1 | 2/2009 | Welchko et al. | |
| 2009/0160255 A1 * | 6/2009 | Grady | 307/66 |
| 2009/0224724 A1 | 9/2009 | Ma et al. | |
| 2009/0246596 A1 | 10/2009 | Sridhar et al. | |
| 2009/0322257 A1 | 12/2009 | Kim et al. | |
| 2010/0017249 A1 | 1/2010 | Fincham et al. | |
| 2010/0078997 A1 | 4/2010 | Chen et al. | |
| 2010/0097031 A1 | 4/2010 | King et al. | |
| 2010/0110741 A1 | 5/2010 | Lin et al. | |
| 2010/0141203 A1 | 6/2010 | Graziano et al. | |
| 2010/0165668 A1 * | 7/2010 | Lin | 363/21.02 |
| 2010/0215994 A1 | 8/2010 | Kim | |
| 2010/0225274 A1 | 9/2010 | Fujitake | |
| 2010/0228413 A1 | 9/2010 | Fujitake | |
| 2010/0292890 A1 | 11/2010 | Morris | |
| 2010/0295507 A1 | 11/2010 | Ishii et al. | |
| 2010/0299008 A1 | 11/2010 | Mitsutani | |
| 2011/0029144 A1 | 2/2011 | Muller et al. | |
| 2011/0057604 A1 | 3/2011 | Capella | |
| 2011/0057611 A1 | 3/2011 | Nakaso et al. | |
| 2011/0095728 A1 | 4/2011 | Chen et al. | |
| 2011/0121779 A1 | 5/2011 | Ichikawa et al. | |
| 2011/0163722 A1 | 7/2011 | Gale et al. | |
| 2011/0166725 A1 | 7/2011 | Booth et al. | |
| 2011/0169447 A1 | 7/2011 | Brown et al. | |
| 2011/0199048 A1 | 8/2011 | Yokoyama et al. | |
| 2011/0202192 A1 | 8/2011 | Kempton | |
| 2011/0204845 A1 | 8/2011 | Paparo et al. | |
| 2011/0210698 A1 | 9/2011 | Sakai | |
| 2012/0049796 A1 | 3/2012 | Fukatsu | |
| 2012/0268065 A1 | 10/2012 | Klesyk | |
| 2013/0119755 A1 | 5/2013 | Klesyk | |
| 2013/0120889 A1 | 5/2013 | Klesyk | |

FOREIGN PATENT DOCUMENTS

| | | |
|---|---|---|
| CN | 201122850 Y | 9/2008 |
| CN | 201345044 Y | 11/2009 |
| CN | 101777779 A | 7/2010 |
| CN | 201528214 U | 7/2010 |
| CN | 101801711 A | 8/2010 |
| CN | 101814725 A | 8/2010 |
| CN | 102005789 A | 4/2011 |
| CN | 102037625 A | 4/2011 |
| CN | 102085861 A | 6/2011 |
| CN | 102104280 A | 6/2011 |
| CN | 102195224 A | 9/2011 |
| DE | 202006020319 U1 | 5/2008 |
| DE | 202008005682 U1 | 2/2009 |
| DE | 102008047502 A1 | 4/2010 |
| KR | 20070064851 A | 6/2007 |
| WO | 2007081531 A2 | 7/2007 |
| WO | 2009037966 | 3/2009 |
| WO | 2010035676 A1 | 4/2010 |

OTHER PUBLICATIONS

Notice of Allowance for U.S. Appl. No. 13/294,423 dated Mar. 30, 2015.
Office Action for U.S. Appl. No. 13/294,423 dated Nov. 12, 2014.
German Patent Application No. 10 2012 210 448.8, Office Action dated Dec. 18, 2014.
Office Action for U.S. Appl. No. 13/091,214 dated May 20, 2014.
Final Office Action for U.S. Appl. No. 13/091,214 dated Dec. 17, 2014.
Office Action for U.S. Appl. No. 13/091,214 dated Apr. 17, 2015.
Notice of Allowance for U.S. Appl. No. 13/294,423 dated Aug. 10, 2015.
Notice of Allowance for U.S. Appl. No. 13/293,343 dated Sep. 9, 2015, 13 pages.
Office Action for U.S. Appl. No. 13/091,214 dated Sep. 24, 2015, 28 pages.

* cited by examiner

MULTISTAGE POWER SUPPLY SYSTEM AND METHOD FOR PROVIDING UNINTERRUPTED POWER TO VEHICLE CIRCUITRY

TECHNICAL FIELD

The following relates to a dual source, multistage power supply system and method for use in an electric or hybrid-electric vehicle for providing uninterrupted low voltage electrical power to vehicle control circuitry.

BACKGROUND

As is well known in the automobile industry, electric vehicles (EV) and hybrid-electric vehicles (HEV) may be provided with one or more high voltage batteries for powering the vehicle drivetrain. Such batteries require periodic re-charging after depletion, which may be accomplished by connecting the vehicle to a high voltage AC power line, which may be 120 or 240 volt AC, supplied by an electric utility grid. Such a connection may utilize a suitable vehicle connector configured to interface with a vehicle on-board battery charger (OBC).

Electric and hybrid-electric vehicles may also include a low voltage battery, such as a 12 volt DC battery, for powering low voltage vehicle electrical systems and circuitry. Some or all of such electrical systems and/or circuitry of an EV or HEV could be supplied with energy from a high voltage power source when the vehicle is connected to an AC power line. In that event, such a power source is virtually unlimited and such an arrangement would help preserve the charge and/or extend the life of the vehicle 12 volt DC battery. In the absence of the vehicle connection to the AC power line, certain control circuitry could be supplied with sufficient power from the vehicle 12 volt DC battery to perform various diagnostic functions and/or to permit reprogramming of that control circuitry, such as re-flashing for software updates.

Such an arrangement, however, requires switching between the high voltage power source and the vehicle 12 volt DC battery, depending upon the presence or absence of the vehicle connection to the high voltage AC power line. Such switching may be accomplished using control circuitry and suitable components to sense or detect the presence of the high voltage power. The use of such control circuitry and sensing components, however, adds cost to the EV or HEV and necessarily increases the possibility of circuitry, component and/or system failures.

As a result, there exists a need for multistage power supply system and method for providing uninterrupted low voltage electrical power to control circuitry in an EV or HEV. Such a multistage power supply system and method would be dual source, accepting energy from a high voltage power source and a low voltage vehicle battery. Such a multistage power supply system and method would provide low voltage power for vehicle control circuitry from the high voltage power source when the high voltage power source is present as a result of a connection of an EV or HEV to a high voltage AC power line, and would provide such low voltage power from the low voltage vehicle battery when the high voltage power source is absent. Such a multistage power supply system and method, which could be implemented as part of a vehicle OBC, would do so without control circuitry for switching between the high voltage power source and the low voltage vehicle battery and with a minimal number of components in order to reduce cost and improve reliability.

SUMMARY

According to one embodiment disclosed herein, a multistage power supply system is provided for providing uninterrupted low voltage electrical power to control circuitry in an electric or hybrid-electric vehicle. The system comprises a first stage comprising a converter for receiving a low voltage input from a vehicle battery and converting the vehicle battery low voltage input to a high voltage output. The system further comprises a second stage provided in series communication with the first stage, the second stage comprising a converter for receiving one of a rectified AC high voltage input and the first stage high voltage output and converting the one of the rectified AC high voltage input and the first stage high voltage output to a low voltage output for use in powering the vehicle control circuitry. The low voltage output is produced by the second stage from the rectified AC high voltage input when the rectified AC high voltage input is present, and the low voltage output is produced by the second stage from the first stage high voltage output when the rectified AC high voltage input is absent.

According to another embodiment disclosed herein, a method is provided for providing uninterrupted low voltage electrical power to control circuitry in an electric or hybrid-electric vehicle. The method comprises receiving a low voltage input from a vehicle battery, and converting the vehicle battery low voltage input to a high voltage output. The method further comprises receiving one of a rectified AC high voltage input and the high voltage output, and converting the one of the rectified AC high voltage input and the high voltage output to a low voltage output for use in powering the vehicle control circuitry. The low voltage output is produced from the rectified AC high voltage input when the rectified AC high voltage input is present, and the low voltage output is produced from the high voltage output when the rectified AC high voltage input is absent.

The method may further comprise providing a multistage power supply system having a first stage and a second stage provided in series communication with the first state. Receiving the vehicle battery low voltage input and converting the vehicle battery low voltage input to a high voltage output may be performed by the first stage of the multistage power supply system. Receiving one of a rectified AC high voltage input and the high voltage output and converting the one of the rectified AC high voltage input and the high voltage output to a low voltage output may be performed by the second stage of the multistage power supply system.

According to further embodiments, the rectified AC high voltage input may be produced as an output by a bulk power source, the rectified AC high voltage input may have a minimum value, the first stage converter may be provided in communication with the bulk power source output, and the first stage converter may have a setpoint less than the minimum value of the rectified AC high voltage input so that the first stage converter produces the first stage high voltage output only in the absence of the rectified AC high voltage input. The first stage converter may comprise a boost converter and the second stage converter may comprise an isolated flyback converter.

A detailed description of these embodiments and accompanying drawings is set forth below.

DETAILED DESCRIPTION

Figure 1:
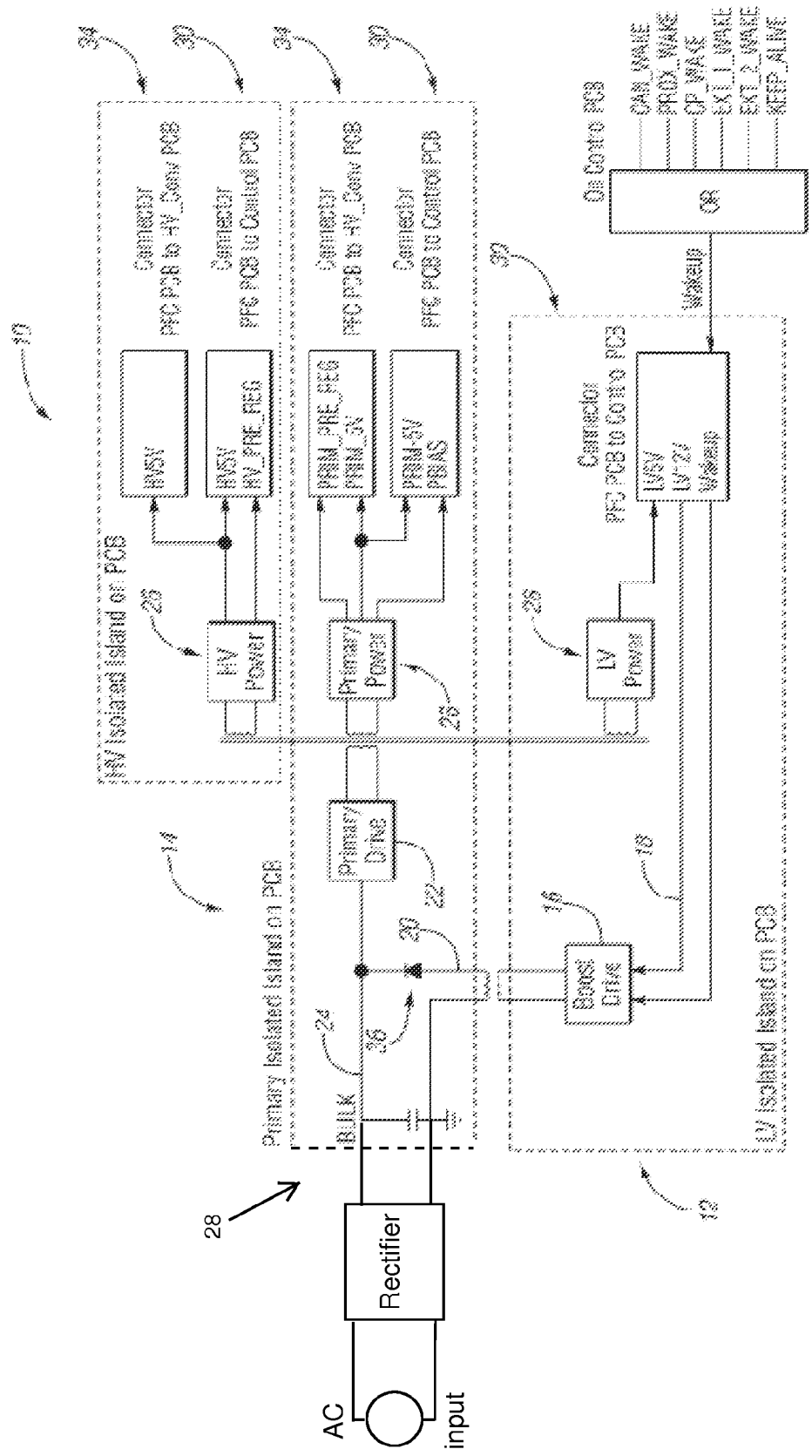
FIG. 1 is a simplified schematic diagram of a multistage power supply system described herein for use in an electric or hybrid-electric vehicle for providing uninterrupted low voltage electrical power to control circuitry in the vehicle.
Figure 2:
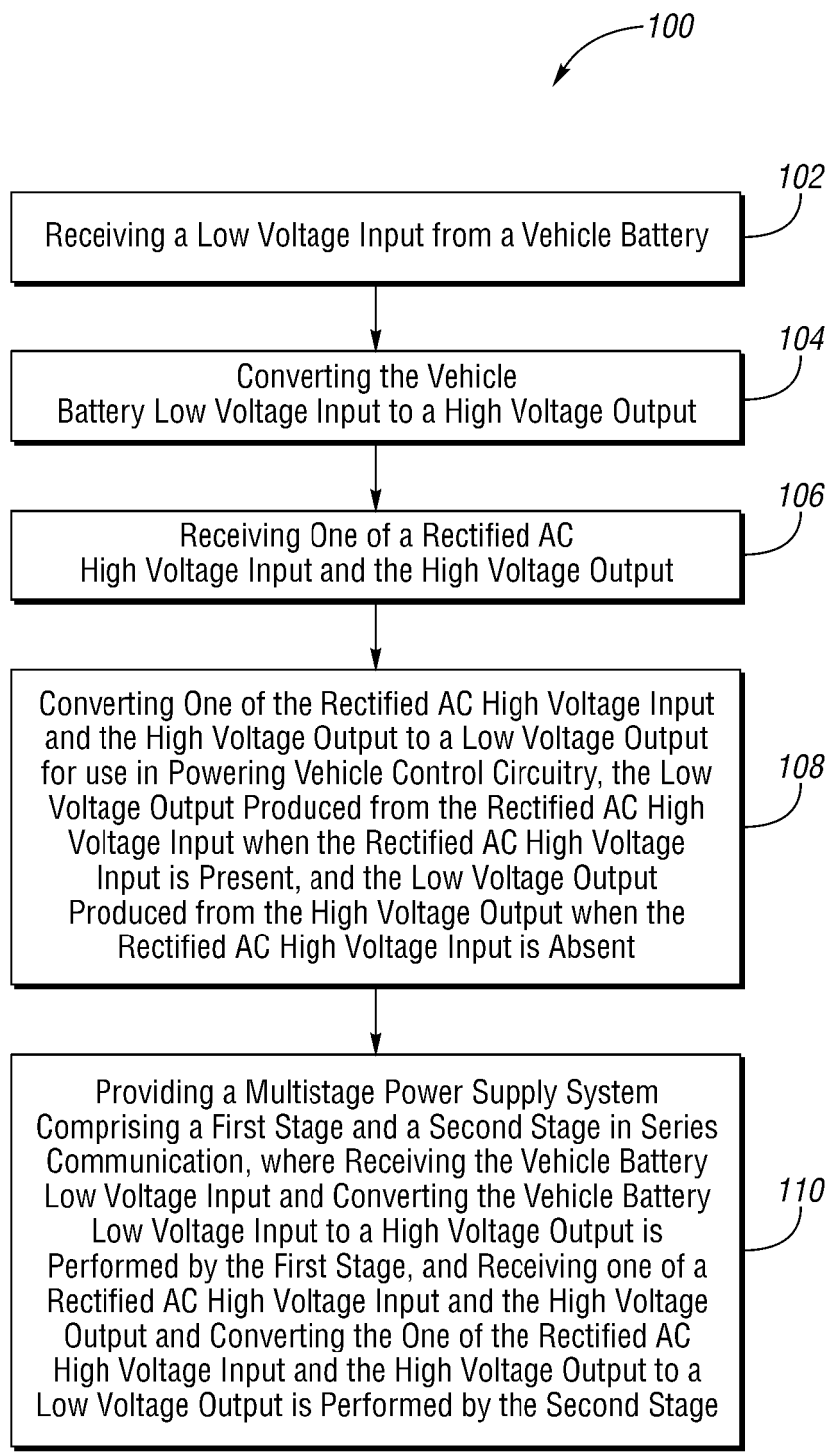
FIG. 2 is an exemplary, simplified flowchart of a method described herein for providing uninterrupted low voltage electrical power to control circuitry in an electric or hybrid-electric vehicle.

With reference to FIGS. 1 and 2, a multistage power supply system for use in an electric or hybrid-electric vehicle for providing uninterrupted low voltage electrical power to control circuitry in the vehicle, and a method for providing uninterrupted low voltage electrical power to control circuitry in an electric or hybrid-electric vehicle will be described. For ease of illustration and to facilitate understanding, like reference numerals may be used herein for like components and features throughout the drawings.

As previously discussed, EV and HEV high voltage batteries for powering the vehicle drivetrain require periodic re-charging after depletion. Such re-charging may be accomplished by connecting the vehicle to a high voltage AC power line, which may be 120 or 240 volt AC, supplied by an electric utility grid using a suitable vehicle connector configured to interface with a vehicle on-board battery charger (OBC).

As also discussed, EV and HEV low voltage batteries, such as a 12 volt DC battery, may provide power to low voltage vehicle electrical systems and circuitry. Some or all of such EV or HEV electrical systems and/or circuitry could be supplied power by a power supply system from a high voltage power source when the vehicle is connected to a high voltage AC power line. In that event the power source is virtually unlimited and such an arrangement would help preserve the charge and/or extend the life of the vehicle 12 volt DC battery. In the absence of the vehicle connection to the high voltage AC power line, certain control circuitry could be provided with sufficient power by the power supply system from the vehicle 12 volt DC battery to perform various diagnostics and/or to permit reprogramming of that control circuitry.

Such an arrangement, however, requires switching between the high voltage power source and the vehicle 12 volt DC battery, depending upon the presence or absence of the vehicle connection to the high voltage AC power line. That switching may be accomplished using control circuitry and suitable components to sense or detect the presence of the high voltage power, but such an approach adds cost to the EV or HEV and increases the possibility of circuitry, component and/or system failures.

There is therefore a need for a multistage power supply system and method, which could be implemented as part of a vehicle on-board charger (OBC), for providing uninterrupted low voltage electrical power to control circuitry in an EV or HEV. Such a system and method would provide low voltage power for vehicle control circuitry from a high voltage power source when the high voltage power source is present, and would provide such low voltage power from the low voltage vehicle battery when the high voltage power source is absent. Such a system and method would also provide robust and reliable operation, without control circuitry for switching between the high voltage power source and the low voltage vehicle battery and with a minimal number of components.

In general, according to embodiments disclosed herein, a vehicle OBC may be provided with a power supply system that accepts energy from two sources, namely, a rectified high voltage AC input from a high voltage AC power source and a low voltage input from the vehicle low voltage battery. The power supply system and method provide uninterrupted power so that control circuitry, which may be associated with the vehicle OBC, may be re-programmed and perform diagnostic and communication functions even when only the low voltage input from the vehicle low voltage battery is applied. Otherwise, the power supply system and method provide power to such control circuitry from the high voltage power source when it is available. The power supply system and method may be referred to as a housekeeping power supply.

To implement such features, the power supply system comprises two stages connected in series. The first stage is a boost stage that takes the low voltage input from the vehicle low voltage battery, which may be 12 volts DC, and boosts it to a high voltage output, which may be 100 volts DC. The second stage takes a rectified high voltage AC input from a bulk power source and converts that rectified high voltage AC input, such as by using an isolated flyback converter, to produce one or more isolated low voltage outputs, which may be 5 volts DC, to power vehicle control circuitry including associated microprocessors.

In that regard, the high voltage boosted output from the low voltage vehicle batter may be connected via diode to the rectified high voltage AC input provided by the bulk power source. When the EV or HEV is connected to a high voltage AC power line, the bulk power source provides the rectified high voltage AC input, and the second stage automatically starts and produces the isolated low voltage outputs. The first stage boost converter is designed or configured with a setpoint below the minimum of the rectified high voltage AC input so that when that AC input voltage is connected the boost converter naturally turns off because the boost converter output is above the converter setpoint.

Alternatively, when the EV or HEV is not connected to a high voltage AC power line, the bulk power source does not provide the rectified high voltage AC input. Since the input provided by the bulk source is zero, the second stage has no energy from the bulk source. In that event, as previously described, the first stage takes the low voltage input from the vehicle low voltage battery and boosts it to a high voltage output. That high voltage output is provided as an input to the second stage, which converts it to a low voltage output for use in powering vehicle control circuitry.

In such a fashion, the multistage power supply system and method have the ability to operate from two sources, as well as the ability to preferentially select which source is used (i.e., the rectified high voltage AC input). The multistage power supply system and method also draw very low current from the secondary source (the low voltage battery input) when the primary source (the rectified high voltage AC input) is available. No logic circuits are needed to switch between the energy sources, and fewer parts are required than various alternatives, such as two parallel flyback supplies with a diode OR connection and accompanying control circuitry, thereby providing greater reliability.

Referring now to FIG. 1, a simplified schematic diagram is shown of a multistage power supply system for use in an electric or hybrid-electric vehicle. In that regard, as previously described, the multistage power supply system is configured to provide uninterrupted low voltage electrical power to control circuitry in the vehicle.

As seen in FIG. 1, the multistage power supply system (10) comprises a first stage (12) and a second stage (14). The first and second stages (12, 14) of the multistage power supply (10) may be provided in series communication with each other. The first stage (12) of the multistage power supply system (10) comprises a converter (16) for receiving a low voltage input (18) from a vehicle battery (not shown), which may be a 12 volt DC input. The first stage converter (16) is also for converting the vehicle battery low voltage input (18) to a high voltage output (20), which may be a 100 volt DC output. In that regard, the first stage converter (16) may comprise a boost converter for boosting a low voltage 12 volt DC input from the vehicle batter to a high voltage 100 volt DC output.

The second stage (14) of the multistage power supply system (10) comprises a converter (22) for receiving either a rectified AC high voltage input (24) or the high voltage output (20) from the first stage (12) of the multistage power supply system (10). The second stage converter (22), which may be an isolated flyback converter, is also for converting the rectified AC high voltage input (24) or the first stage high voltage output (20) to a low voltage output (26), which may be a 5 volt DC output, for use in powering the vehicle control circuitry (not shown).

More specifically, the low voltage output (26) may be produced by the second stage (14) from the rectified AC high voltage input (24) when the rectified AC high voltage input (24) is present at the input of the second stage converter (22). Alternatively, when the rectified AC high voltage input (24) is absent from the input of the second stage converter (22), the low voltage output (26) may be produced by the second stage (14) from the first stage high voltage output (20).

In that regard, the rectified AC high voltage input (24) may be produced as an output by a bulk power source (28) and has a minimum value associated therewith. In that regard, the bulk power source (28) may comprise a rectifier and may produce the rectified AC high voltage input (24) by rectifying an AC high voltage input received from an AC power line (not shown).

Still referring to FIG. 1, the first stage converter (16) may be provided in communication with the output of the bulk power source (28) (i.e., the rectified AC high voltage input (24)), such as via diode (36), and may be designed with a setpoint less than the minimum value of the rectified AC high voltage input (24). As a result, in the absence of the rectified AC high voltage input (24) at the input of the second stage converter (22), the first stage converter (16) may produce the first stage high voltage output (20) which may be supplied to the input of second stage converter (22).

As is readily apparent, then, when the rectified AC high voltage input (24) is produced by the bulk power source (28) as a result of a connection of the EV or HEV to a high voltage AC power line, the vehicle control circuitry may be provided with electrical power via the multistage power supply system (10) from the bulk power source (28). Alternatively, in the absence a connection of the vehicle to a high voltage AC power line, the vehicle control circuitry may still provided with electrical power via the multistage power supply system (10) from the vehicle battery.

Thus, the multistage power supply system (10) may provide uninterrupted low voltage electrical power to the vehicle control circuitry, without regard to whether the vehicle is connected to a high voltage AC power line. In such a fashion, even in the absence of a vehicle connection to a high voltage AC power line, sufficient power may still be provided to the vehicle control circuitry via the multistage power supply system (10) for the control circuitry to perform various diagnostic operations or to permit reprogramming or re-flashing of the control circuitry.

It should be noted that the low voltage output (26) for use in powering the vehicle control circuitry may comprise multiple isolated low voltage outputs for use in powering multiple controllers that are part of the vehicle control circuitry (not shown). For example, one low voltage output (26) may be provided for powering a controller (not shown) for use in primary control operations via a connector (30). Similarly, another low voltage outputs (26) may be provided for powering a controller (not shown) for use in low voltage control operations via another connector (32). Still another low voltage output (26) may be provided for powering a controller (not shown) for use in high voltage control operations via still another connector (34).

Referring now to FIG. 2, an exemplary, simplified flowchart is shown of a method for providing uninterrupted low voltage electrical power to control circuitry in an electric or hybrid-electric vehicle. As seen therein, and with continuing reference to FIG. 1, the method (100) may comprise receiving (102) a low voltage input (18) from a vehicle battery, and converting (104) the vehicle battery low voltage input (18) to a high voltage output (20).

The method (100) may further comprise receiving (106) one of a rectified AC high voltage input (24) and the high voltage output (20), and converting (108) one of the rectified AC high voltage input (24) and the high voltage output (20) to a low voltage output (26) for use in powering the vehicle control circuitry. As previously described, the low voltage output (26) may be produced from the rectified AC high voltage input (24) when the rectified AC high voltage input (24) is present, and the low voltage output (26) may be produced from the high voltage output (20) when the rectified AC high voltage input (24) is absent.

The method (100) may further comprise providing (110) a multistage power supply system (10) having a first stage (12) and a second stage (14) in series communication. In that regard, receiving the vehicle battery low voltage input (18) and converting the vehicle battery low voltage input (18) to a high voltage output (20) may be performed by the first stage (12) of the multistage power supply system (10). Receiving one of a rectified AC high voltage input (24) and the high voltage output (20) and converting the one of the rectified AC high voltage input (24) and the high voltage output (20) to a low voltage output (26) may be performed by the second stage (14) of the multistage power supply system (10).

As described in detail above in connection with FIG. 1, the first stage converter (16) may comprise a boost converter for boosting the vehicle battery low voltage input (18), which may comprise a 12 volt DC input, to produce the high voltage output (20), which may comprise a 100 volt DC output. As also previously described, the second stage converter (22) may comprise an isolated flyback converter. It should also be noted that the steps of the method (100) may be performed in an order other than that illustrated and described herein, which order is exemplary only, including the performance of one or more of the steps simultaneously.

As well, the rectified AC high voltage input (24) may again be produced as an output by a bulk power source (28), which may comprise a rectifier and produce the rectified AC high voltage input (24) by rectifying an AC high voltage input from an AC power line. The rectified AC high voltage input (24) has a minimum value associated therewith. The first stage converter (16) may be provided in communication with the output of the bulk power source (28) (i.e., the rectified AC high voltage input (24)), and may be provided with a setpoint less than the minimum value of the rectified AC high voltage input (24). In such a fashion, the first stage converter (16) may be configured to produce the high voltage output (20) in the absence of the rectified AC high voltage input (24).

Once again, as previously described in detail in connection with FIG. 1, the low voltage output (26) for use in powering the vehicle control circuitry may comprise multiple low voltage isolated outputs for use in powering multiple controllers that are part of the vehicle control circuitry. As also previously described, even in the absence of a vehicle connection to a high voltage AC power line, sufficient power may still be provided to the vehicle control circuitry via the method (100) for the control circuitry to perform various diagnostic operations and/or to permit reprogramming or re-flashing of the control circuitry.

As is readily apparent from the foregoing description, a multistage power supply system and method are disclosed for providing uninterrupted low voltage electrical power to control circuitry in an EV or HEV. The system and method are dual source, accepting energy from a high voltage power source and a low voltage vehicle battery. The system and method provide low voltage power for vehicle control circuitry from the high voltage power source when the high voltage power source is present, such as via connection of an EV or HEV to a high voltage AC power line, and provide such low voltage power from the low voltage vehicle battery when the high voltage power source is absent. The system and method, which may implemented as part of a vehicle OBC, do so without control circuitry for switching between the high voltage power source and the low voltage vehicle battery, and with a minimal number of components in order to reduce cost and improve reliability While certain embodiments of a multistage power supply system and method for use in an EV or HEV for providing uninterrupted low voltage electrical power to vehicle control circuitry have been illustrated and described herein, they are exemplary only and it is not intended that these embodiments illustrate and describe all those possible. Instead, the words used herein are words of description rather than limitation, and it is understood that various changes may be made without departing from the spirit and scope of the following claims.

What is claimed is:

1. A multistage power supply system for providing uninterrupted low voltage electrical power to vehicle control circuitry in an electric or hybrid-electric vehicle having a vehicle battery, the system comprising:
    a first stage comprising a converter for receiving a low voltage input from the vehicle battery and converting the vehicle battery low voltage input to a high voltage output; and
    a second stage provided in series communication with the first stage, the second stage comprising a converter for receiving one of a rectified AC high voltage input and the first stage high voltage output and converting the one of the rectified AC high voltage input and the first stage high voltage output to a low voltage output to power the vehicle control circuitry;
    wherein the low voltage output is produced by the second stage from the rectified AC high voltage input when the rectified AC high voltage input is present, and the low voltage output is produced by the second stage from the first stage high voltage output when the rectified AC high voltage input is absent without detection of the absence of the rectified AC high voltage input and wherein the low voltage output produced by the second stage from the first stage high voltage output provides at least a power level to the vehicle control circuitry required for the control circuitry to perform diagnostic operations or to permit reprogramming of the control circuitry when the rectified AC high voltage input is absent.

2. The system of claim 1 wherein the rectified AC high voltage input is produced as an output by a bulk power source, the rectified AC high voltage input has a minimum value, the first stage converter is provided in communication with the bulk power source output, and the first stage converter has a setpoint less than the minimum value of the rectified AC high voltage input so that the first stage converter produces the first stage high voltage output in the absence of the rectified AC high voltage input.

3. The system of claim 2 wherein the bulk power source comprises a rectifier for rectifying an AC high voltage input received from an AC power line.

4. The system of claim 1 wherein the vehicle battery low voltage input comprises a 12 volt DC input and the first stage high voltage output comprises a 100 volt DC output.

5. The system of claim 1 wherein the low voltage output for use in powering the vehicle control circuitry comprises a 5 volt DC output.

6. The system of claim 1 wherein the low voltage output comprises a plurality of low voltage outputs for use in powering a plurality of controllers, a first one of the plurality of low voltage outputs for powering a first controller for use in primary control operations, a second one of the plurality of low voltage outputs for powering a second controller for use in low voltage control operations, and a third one of the plurality of low voltage outputs for powering a third controller for use high voltage control operations.

7. The system of claim 1 wherein the second stage converter comprises an isolated flyback converter.

8. The system of claim 1 wherein the first stage converter comprises a boost converter.

9. A method for providing uninterrupted low voltage electrical power to vehicle control circuitry in an electric or hybrid-electric vehicle having a vehicle battery and a multistage power supply, the method comprising:
    receiving, at a first stage, a low voltage input from the vehicle battery;
    converting, by the first stage, the vehicle battery low voltage input to a high voltage output;
    receiving, at a second stage provided in serial communication with the first stage, one of a rectified AC high voltage input and the high voltage output; and
    converting, by the second stage, the one of the rectified AC high voltage input and the high voltage output to a low voltage output to power the vehicle control circuitry;
    wherein the low voltage output is produced from the rectified AC high voltage input when the rectified AC high voltage input is present, and the low voltage output is produced from the high voltage output when the rectified AC high voltage input is absent without detection of the absence of the rectified AC high voltage input and wherein the low voltage output produced by the second stage from the first stage high voltage output provides at least a power level to the vehicle control circuitry required for the control circuitry to perform diagnostic operations or to permit reprogramming of the control circuitry when the rectified AC high voltage input is absent.

10. The method of claim 9 wherein the rectified AC high voltage input is produced as an output by a bulk power source, the rectified AC high voltage input has a minimum value, the first stage comprises a converter provided in communication with the bulk power source output, and the first stage converter has a setpoint less than the minimum value of the rectified AC high voltage input so that the first stage converter produces the first stage high voltage output in the absence of the rectified AC high voltage input.

11. The method of claim 10 wherein the bulk power source comprises a rectifier for rectifying an AC high voltage input received from an AC power line.

12. The method of claim 9 wherein the vehicle battery low voltage input comprises a 12 volt DC input and the first stage high voltage output comprises a 100 volt DC output.

13. The method of claim 9 wherein the low voltage output for use in powering the vehicle control circuitry comprises a 5 volt DC output.

14. The method of claim 9 wherein the low voltage output comprises a plurality of low voltage outputs for use in powering a plurality of controllers, a first one of the plurality of low voltage outputs for powering a first controller for use in primary control operations, a second one of the plurality of low voltage outputs for powering a second controller for use in low voltage control operations, and a third one of the plurality of low voltage outputs for powering a third controller for use high voltage control operations.

15. The method of claim 9 wherein the second stage comprises an isolated flyback converter.

16. The method of claim 9 wherein the first stage converter comprises a boost converter.

* * * * *